United States Patent
Seehof

(10) Patent No.: US 8,876,324 B2
(45) Date of Patent: Nov. 4, 2014

(54) HANDRAIL WITH ORIENTABLE ILLUMINATION

(71) Applicant: Hansen International, Inc., Lexington, SC (US)

(72) Inventor: John J. Seehof, Lexington, SC (US)

(73) Assignee: Hansen International, Inc., Lexington, SC (US)

( * ) Notice: Subject to any disclaimer, the term of this patent is extended or adjusted under 35 U.S.C. 154(b) by 61 days.

(21) Appl. No.: 13/740,393

(22) Filed: Jan. 14, 2013

(65) Prior Publication Data

US 2013/0182428 A1  Jul. 18, 2013

Related U.S. Application Data

(60) Provisional application No. 61/586,335, filed on Jan. 13, 2012.

(51) Int. Cl.
| | |
|---|---|
| *E04F 11/18* | (2006.01) |
| *F21V 21/14* | (2006.01) |
| *F21V 33/00* | (2006.01) |
| *F21V 21/30* | (2006.01) |
| *B60Q 1/24* | (2006.01) |
| *B60Q 1/26* | (2006.01) |
| *F21S 4/00* | (2006.01) |
| *F21Y 101/02* | (2006.01) |

(52) U.S. Cl.
CPC .............. *F21V 21/14* (2013.01); *E04F 11/1836* (2013.01); *F21V 33/006* (2013.01); *F21V 21/30* (2013.01); *B60Q 1/24* (2013.01); *B60Q 1/2661* (2013.01); *F21S 4/008* (2013.01); *F21Y 2101/02* (2013.01); *B60Q 2400/40* (2013.01); *E04F 2011/1872* (2013.01)
USPC ........................... 362/222; 362/145; 362/146

(58) Field of Classification Search
CPC .............. E04F 11/1804; B60Q 3/0233; F21Y 2103/00; F21W 2111/08
USPC ......................................... 362/145, 146, 222
See application file for complete search history.

(56) References Cited

U.S. PATENT DOCUMENTS

| | | | |
|---|---|---|---|
| 4,895,332 A | | 1/1990 | Hansen et al. |
| 5,779,228 A | | 7/1998 | Hansen |
| D474,281 S | | 5/2003 | Hansen |
| D621,955 S | | 8/2010 | Seehof |
| D630,768 S | | 1/2011 | Witiak |
| 8,002,426 B2 | * | 8/2011 | Pearson et al. ................ 362/152 |
| D647,213 S | | 10/2011 | Seehof |
| D647,214 S | | 10/2011 | Seehof et al. |
| D647,215 S | | 10/2011 | Seehof |
| D647,629 S | | 10/2011 | Seehof |
| D647,630 S | | 10/2011 | Seehof et al. |
| D647,631 S | | 10/2011 | Seehof |

* cited by examiner

*Primary Examiner* — Anabel Ton
(74) *Attorney, Agent, or Firm* — Thomas, Karceski & Karmilovich, P.C.

(57) ABSTRACT

A handrail assembly for lighting an adjacent area includes two stanchions for attachment to a surface, each stanchion including mounting structure; a bar for attachment to the stanchions, the bar having two ends and defining mounting structure at the ends; and a lighting element configured to be carried by the bar. The mounting structure of the stanchions and bars cooperate to provide two alternate mounting orientations of the bar within the stanchions. In a first of the orientations the lighting element is offset circumferentially in a first direction relative to a centerline of the stanchions lighting a first adjacent area on a first side of the stanchions. In a second of the orientations the lighting element is offset circumferentially in a second direction opposite the first direction relative to the centerline of the stanchions lighting a second adjacent area on a second side of the stanchions.

9 Claims, 3 Drawing Sheets

HANDRAIL WITH ORIENTABLE ILLUMINATION

RELATED APPLICATIONS

The present application claims the benefit under 35 U.S.C. §119(e) of U.S. Patent Application Ser. No. 61/586,335, filed Jan. 13, 2012, which application is incorporated by reference herein for all purposes.

TECHNICAL FIELD

The present disclosure relates to a lighted hand rail and, in particular, to illuminated hand rails adapted for use on trucks, emergency vehicles, and other vehicles. The hand rail light can be directed to specific orientations relative to the mounting stanchions.

BACKGROUND

Vehicle hand rails are typically used as aids to entry and exit from doorways and are normally secured to the vehicle in close proximity to an entry or cargo door. Hand rails should resist both pulling and torsional forces and should provide an effective grip for a user's hand. An anti-slip hand rail having elastomeric inserts is disclosed in U.S. Pat. No. 4,895,332, U.S. Pat. No. 5,779,228 discloses a handrail having a cavity for receiving a light element. Both patents are incorporated by reference herein.

SUMMARY

The disclosure is directed to a light rail and stanchion combination that allows a selective orientation of the light to a desired location relative to the stanchion. Therefore, light emitted from the handrail impinges on desired areas relative to the stanchion. For example, the light can shine on compartments, handles, steps, etc. near the rail. Lighting is therefore not "wasted" by illuminating unnecessary areas, and light will not shine directly in the eyes of a user which could be distracting or impair vision. A key located in at least one of the stanchions is configured to allow insertion of the rail in one or more desired orientations. The key also prevents the rail from being inserted in undesired orientations. One desirable orientation may be centered at an angle of about 30 degrees to one side of a line between the middle of the stanchion and the surface on which is it mounted. Therefore, light shines closely on the area adjacent the hand rail, such as on an adjacent step or series of steps, handle, compartment, etc. Also, light may reflect off the adjacent surface to further illuminate the nearby area and items.

According to certain aspects of the disclosure, a handrail assembly for lighting an adjacent area includes two stanchions for attachment to a surface, each stanchion including mounting structure; a bar for attachment to the stanchions, the bar having two ends and defining mounting structure at the ends; and a lighting element configured to be carried by the bar. The mounting structure of the stanchions and bars cooperate to provide two alternate mounting orientations of the bar within the stanchions. In a first of the orientations the lighting element is offset circumferentially in a first direction relative to a centerline of the stanchions lighting a first adjacent area on a first side of the stanchions. In a second of the orientations the lighting element is offset circumferentially in a second direction opposite the first direction relative to the centerline of the stanchions lighting a second adjacent area on a second side of the stanchions. Various options and modifications are possible.

According to certain other aspects of the disclosure, a stanchion is disclosed for a handrail assembly having a lighted bar for lighting an adjacent area, the stanchion including a base portion for attachment to a surface; a middle section extending from the base portion; and mounting structure attached to the middle section for receiving the bar. The mounting structure includes a cup and a key within the cup cooperative with the bar to provide two alternate mounting orientations of the bar within the stanchion. In a first of the orientations the lighting element is offset circumferentially in a first direction relative to a centerline of the stanchion, and in a second of the orientations the lighting element is offset circumferentially in a second direction opposite the first direction relative to the centerline of the stanchion. Various options and modifications are possible.

BRIEF DESCRIPTION OF THE DRAWINGS

More details of the present disclosure are set forth in the drawings.

DETAILED DESCRIPTION

Figure 1:
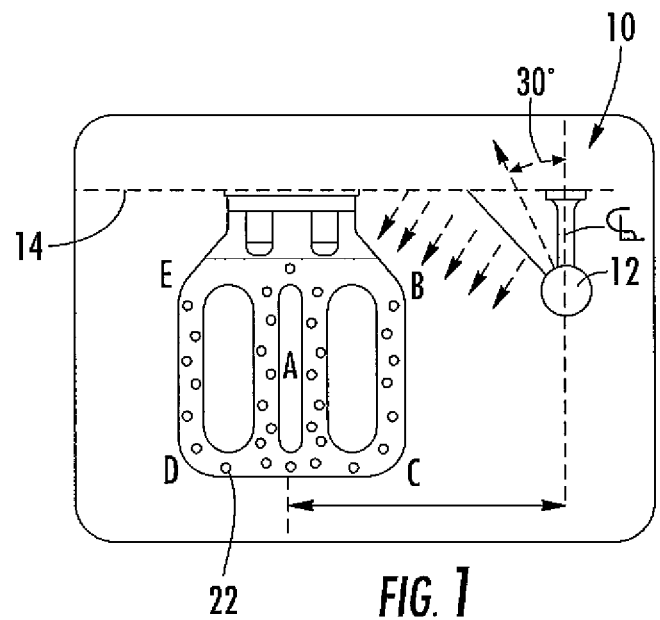
FIG. 1 is a top view of a lighted hand rail assembly adjacent a step according to certain aspects of the invention.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

The drawings and detailed description provide a full and enabling description of the disclosure and the manner and process of making and using it. Each embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

The present disclosure is concerned with an improved vehicle hand rail having a selectively orientable light held within a cavity in the rail. As shown in FIGS. 1-10 a hand rail assembly 10 includes an elongated bar 18 extending between a pair of brackets (also called stanchions) 12 mounted to wall 14 of a vehicle. The bar may if desired include one or more optional grip assisting elements such as knurled areas 20 extending longitudinally along the bar to aid a user's grip. It should be understood that knurled areas 20 may be formed in other ways, either integrally or via items attached to or inserted into bar 18. Bar 18 includes a cavity 50 to receive a light element 52 for lighting an area on or about vehicle 16. An electrical cord may provide power to the lighting element through one of the brackets 12. While power may be provided by the vehicle's electrical system, it should be understood that other manners of energizing the lighting element are possible. For example, assembly 10 may include or receive power from a battery.

Figure 2:
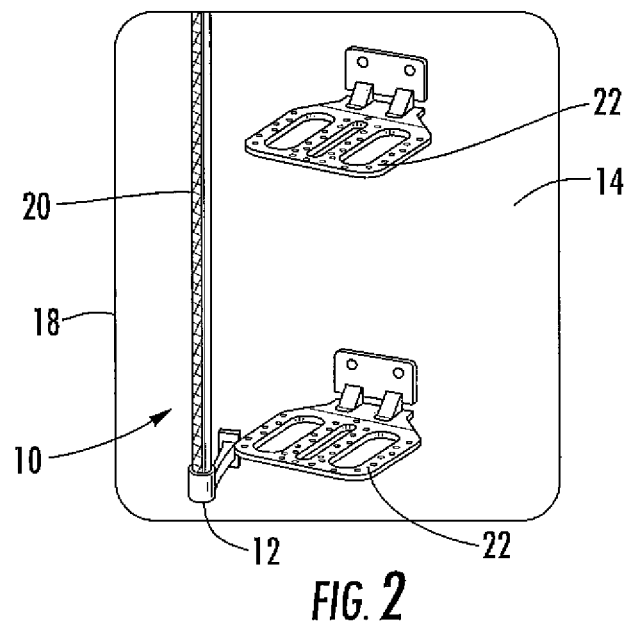
FIG. 2 is a perspective view of a lighted hand rail assembly adjacent two steps according to certain aspects of the invention.
Figure 3:
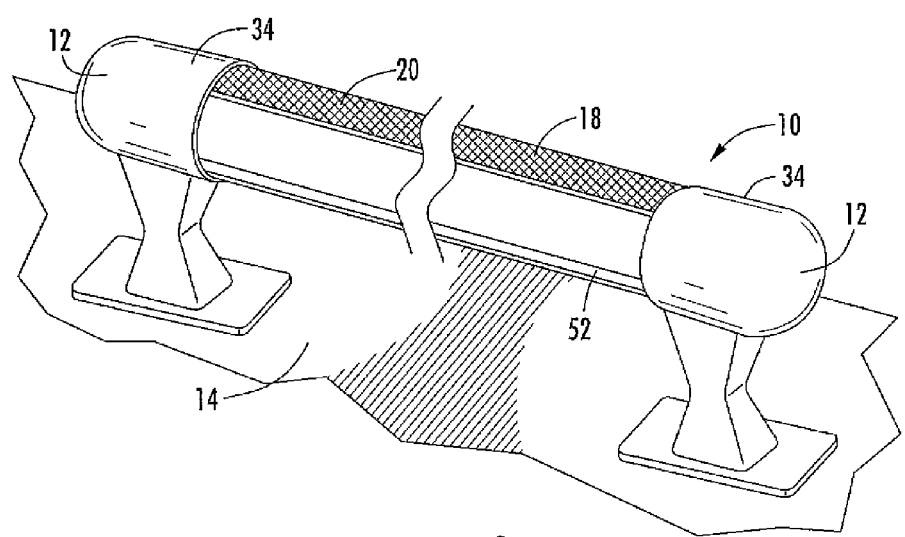
FIG. 3 is a perspective view of a hand rail assembly as in FIG. 1 or 2.
Figure 4:
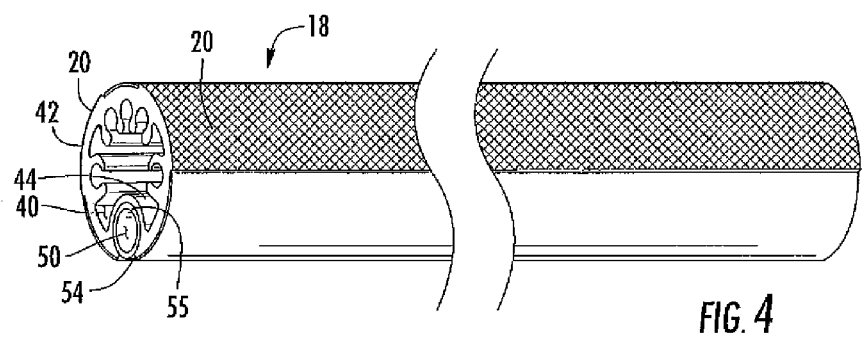
FIG. 4 is a perspective view of a rail of the hand rail assembly of FIG. 3.
Figure 5:
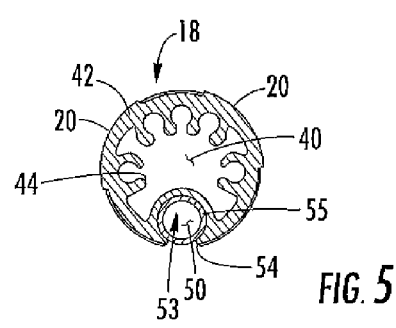
FIG. 5 is an end view of the rail of FIG. 4.
Figure 6:
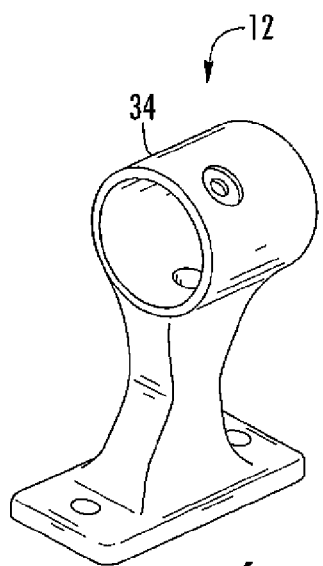
FIG. 6 is a perspective view of a stanchion of the hand rail assembly of FIG. 3.
Figure 7:
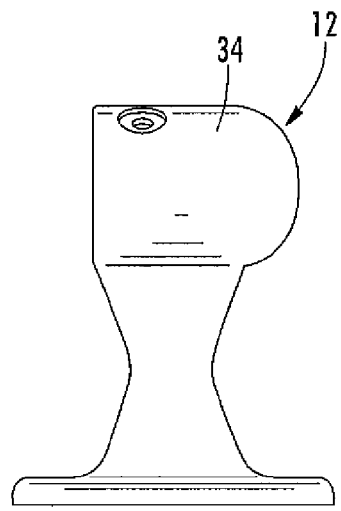
FIG. 7 is a side view of the stanchion of FIG. 6.

While assembly 10 is shown in in a vertical position adjacent steps 22 in FIGS. 1 and 2, it should be understood that various suitable orientations are possible, depending upon the requirements of the vehicle. The assembly may be placed, for example, near vehicle doors, cargo areas, or other areas requiring operator access.

Table 1 shows illumination of areas A-E of steps 22 using rail assembly 10 mounted with the center line of bar 18 about 8.0 inches from the center of steps 22.

TABLE 1

| Position | Light Collected (Foot Candles) |
| --- | --- |
| A | 5.47 |
| B | 16.80 |
| C | 2.43 |
| D | 2.93 |
| E | 10.30 |

Furthermore, bar 18 may be rotatable to only one or to a plurality of rotational positions, enabling an operator to selectively direct light from the assembly to a desired area. For example, bar 18 in FIG. 1 is positioned so that light is directed to an area of wall 14 and the adjacent steps 22. As shown in FIG. 1, bar 18 is rotated to a position such that the light is directed at about 30 degrees from center toward steps 22.

Bar 18 may be constructed from a metallic, such as aluminum, extrusion and may have a solid or hollow interior. The bar may be constructed in various suitable sizes and may, for example, have a diameter ranging from 0.75 inches to 2.0 inches. One preferable construction includes a bar diameter of about 1.25 inches and a length of 4 feet or less. As illustrated in the figures, bar 18 defines a generally circular cross section. Although the bar may define elevated portions or ridges, for example at the gripping surfaces, the bar cross section approximates a circle.

Figure 8:
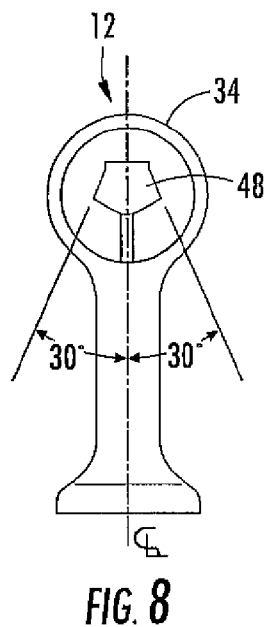
FIG. 8 is an end view of the stanchion of FIG. 6.
Figure 9:
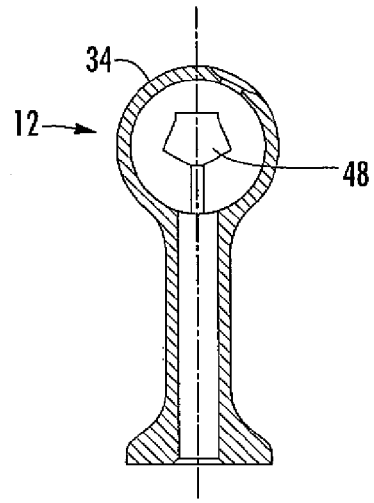
FIG. 9 is a cross-sectional view through the stanchion of FIG. 6.
Figure 10:
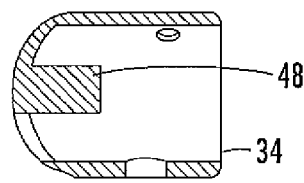
FIG. 10 is a cross-sectional view through the head of the stanchion of FIG. 6.

In the embodiment as shown, bar 18 defines an inner cavity 40 defined by inner wall 44 extending longitudinally between end faces 42. The inner cavity 40 is configured to receive a key 48 within stanchion head 34 to secure bar 18 in a desired rotational position. The non-symmetrical shape of the side and base surfaces of key 48, in cooperation with the wall 44, permits two possible rotational positions. Both positions are approximately 30 degrees off center relative to the centerline of the stanchion, as shown in FIG. 8. It should be understood, however, that all suitable configurations are within the scope of the present invention. Thus, for example, key 48 and side walls 44 of interior cavity 40 may have various suitable shapes and configurations. Key 48 could be configured to allow only one possible orientation of bar 18 as well.

Bar 18 also defines the longitudinal cavity 50 to receive a light element 52 including for example, LED's 53 within a transmissive tube 55, although other lighting elements, light pipes, etc., could be used. Cavity 50 defines a restricted opening 54 to retain light element 52 in the radial direction. Opening 54 may be covered by a lens (not shown) to protect element 52 and/or to color the light emitted therefrom. Cavity 50 permits the positioning of light element 52 so that the element does not interfere with the grip of a user. It also directs light emitted from the element and protects the element from damage. Light element 52 is retained in the radial direction by bar 18 and may be slidably inserted and removed via one or both of end faces 42.

Light element 52 could be a single longitudinal element extending the length of bar 18. It should be understood, however, that other configurations are possible, for example including multiple lights disposed along the longitudinal length of the bar. Light element 52 includes a plug device at either end that is received by one or both of the stanchion heads 34 through which an electrical connection may be routed. Alternately, an independent battery source, for example a battery, may also be provided.

While preferred embodiments of the invention have been described above, it is to be understood that any and all equivalent realizations of the present invention are included within the scope and spirit thereof. For example, the gripping and lighting sections need not be entirely discrete, and portions of these sections may alternate with one another. Furthermore, the shaped key may be formed as part of the bar that is received by a corresponding opening in the bracket. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A handrail assembly for lighting an adjacent area, the handrail assembly comprising:
   two stanchions for attachment to a surface, each stanchion including mounting structure;
   a bar for attachment to the stanchions, the bar having two ends and defining mounting structure at the ends; and
   a lighting element configured to be carried by the bar;
   the mounting structure of the stanchions and bars cooperative to provide only two alternate mounting orientations of the bar within the stanchions, wherein in a first of the orientations the lighting element is offset circumferentially in a first direction relative to a centerline of the stanchions lighting a first adjacent area on a first side of the stanchions and wherein in a second of the orientations the lighting element is offset circumferentially in a second direction opposite the first direction relative to the centerline of the stanchions lighting a second adjacent area on a second side of the stanchions, wherein the circumferential offset in the first and second orientations is between about 20 to about 45 degrees.

2. The handrail assembly of claim 1, wherein the circumferential offset in the first and second orientations is about 30 degrees.

3. The handrail assembly of claim 1, wherein the mounting within the stanchion includes a key within the stanchion that extends into an opening within the bar.

4. The handrail assembly of claim 3, wherein the key includes surfaces offset from the centerline of the stanchion so as to allow the bar to be mounted in the alternate mounting orientations.

5. The handrail assembly of claim 4, wherein the surfaces are offset by about 30 degrees.

6. A stanchion for a handrail assembly having a lighted bar for lighting an adjacent area, the stanchion comprising:
   a base portion for attachment to a surface;
   a middle section extending from the base portion; and
   mounting structure attached to the middle section for receiving the bar, the mounting structure including a cup and a key within the cup cooperative with the bar to provide only two alternate mounting orientations of the bar within the stanchion, wherein in a first of the orientations the lighting element is offset circumferentially in a first direction relative to a centerline of the stanchion and wherein in a second of the orientations the lighting element is offset circumferentially in a second direction opposite the first direction relative to the centerline of the stanchion, wherein the circumferential offset in the first and second orientations is between about 20 to about 45 degrees.

7. The stanchion of claim 6, wherein the circumferential offset in the first and second orientations is about 30 degrees.

8. The stanchion of claim 6, wherein the key includes surfaces offset from the centerline of the stanchion so as to allow the bar to be mounted in the alternate mounting orientations.

9. The stanchion of claim 8, wherein the surfaces are offset by about 30 degrees.

* * * * *